US008245436B2

United States Patent
Dunkin

(10) Patent No.: US 8,245,436 B2
(45) Date of Patent: Aug. 21, 2012

(54) REMOTELY OPERATED ELECTRONIC ROTATABLE DECOY STAND

(76) Inventor: Richard Joe Dunkin, Birmingham, AL (US)

( * ) Notice: Subject to any disclaimer, the term of this patent is extended or adjusted under 35 U.S.C. 154(b) by 74 days.

(21) Appl. No.: 12/657,307

(22) Filed: Jan. 19, 2010

(65) Prior Publication Data

US 2010/0186280 A1  Jul. 29, 2010

Related U.S. Application Data

(60) Provisional application No. 61/205,237, filed on Jan. 16, 2009.

(51) Int. Cl.
*A01M 31/06* (2006.01)
(52) U.S. Cl. .................................... 43/2; 43/3
(58) Field of Classification Search ............. 43/2, 3; 40/414; 446/330
See application file for complete search history.

(56) References Cited

U.S. PATENT DOCUMENTS

| 4,965,953 | A | * | 10/1990 | McKinney | 43/2 |
| 5,289,654 | A | * | 3/1994 | Denny et al. | 43/2 |
| 6,442,884 | B1 | * | 9/2002 | Sceery | 43/2 |
| 7,082,710 | B1 | * | 8/2006 | Jorgenson | 43/2 |
| 7,272,905 | B1 | * | 9/2007 | Horton | 43/2 |
| 2004/0025399 | A1 | * | 2/2004 | Donnigan et al. | 43/2 |
| 2008/0078113 | A1 | * | 4/2008 | Denny | 43/2 |

* cited by examiner

*Primary Examiner* — Christopher P Ellis

(57) ABSTRACT

This invention includes a Remotely-operated Electronic Rotatable Decoy Stand designed to support and impart rotational motion to a male turkey decoy. The remotely-operated electronic rotatable decoy stand is removably coupled to a male turkey decoy and is controlled directly by a human observer through activation of an electronic emitting remote fob. When operated, the fob imparts a single signal to the rotatable decoy stand. Upon receipt of the signal, the rotatable decoy stand rotates the coupled decoy at a rotational speed equal to that of a male turkey when presenting and rotating in its natural strutting display. Bi-directional rotation of the decoy is dependent upon the signal direction chosen by the human observer. When positioned in a location likely to be observed by the turkey, the rotational motion provides a method of attracting turkeys. Multiple Remotely-operated Electronic Rotatable Decoy Stands can be non-mechanically electronically linked to and controlled by a single electronic emitting remote fob.

2 Claims, 3 Drawing Sheets

REMOTELY OPERATED ELECTRONIC ROTATABLE DECOY STAND

CROSS REFERENCES

This application claims priority from U.S. Provisional Patent Application Ser. No. 61/205,237 entitled "Remote STRUTT'N 360 Decoy Stand," filed Jan. 16, 2009

BACKGROUND OF THE INVENTION

1. Field of the Invention

The invention pertains to the field of hunting decoys. More particularly, the invention pertains to a remotely-operated electronic rotatable decoy stand, for supporting and rotating hunting decoys. Even more so, the invention pertains to a remotely-operated electronic rotatable decoy stand for controlling and accurately rotating a single male turkey decoy or simultaneously controlling multiple independent non-mechanically coupled remotely-operated electronic rotatable decoy stands for controlling and accurately rotating a single male turkey decoy, one per aforementioned stand, using a single radio-controlled transmitted signal.

2. Description of Related Art

It has long been a common hunting tactic, by those skilled in the art, to attract pursued game with artificial decoys resembling said game. U.S. Pat. No. 410,523, issued Sep. 3, 1889 to Jencks and U.S. Pat. No. 1,603,114, issued Dec. 8, 1924 to Johnson are prior art examples of a known decoy designs. For the most part and since inception, decoys have been and still are, non-moving representations of pursued animals. Static decoys have proven effective under certain circumstances and continue to be marketed as such to those skilled in the art, today. A distinct disadvantage of static decoys is that their ability to deceive approaching animals often ceases due to the pursued animal's ability perceive an unnatural stillness of static decoys. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

A number of strategies have been employed to provide animation to hunting decoys. Some are designed to move in response to natural forces, such as the wind, which can be seen in U.S. Pat. No. 5,515,637, filed May 14, 1996 to Johnson, U.S. Pat. No. 5,613,317, filed Mar. 25, 1997 to Ninegar and U.S. Pat. No. 6,092,322, filed Jul. 25, 2000 to Samaras. A distinct disadvantage of wind induced animation results from imperfect wind speed conditions, often causing these decoys to exhibit atypical or unrealistic movement, which may startle or warn the target animal of impending danger. A further disadvantage of wind induced animation results from a lack of wind altogether, whereby the designed motive force is unavailable, and therefore, no animation is obtained. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

Yet other decoy movement mechanisms incorporate direct coupled monofilament line to provide the motive force for decoy movement. This can be seen in U.S. Pat. No. 4,965,953 issued Oct. 30, 1990 to McKinney and U.S. Pat. No. 6,442,884 issued Sep. 3, 2002 to Sceery. A major disadvantage of said decoy actuation devices is that these mechanisms are often cumbersome to set up and make ready. In many instances, one skilled in the art is presented a situation where an approaching pursued game bird's proximity to said individual cannot allow a period that includes required setup time for the mechanism in hand without alerting the hunted game bird, therefore rendering the mechanism unusable. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

A further distinct disadvantage of said mechanisms exist. These devices are limited to the control of only one (1) decoy from one control device. It is well known to those skilled in the art that turkeys continuously gather in flocks and as such, more than one turkey is in motion at the same time. Simultaneous control of more than one decoy using a single radio transmitted source, further creates a more realistic circumstance to better allure a wild male turkey into a harvestable range. Therefore, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

Still, other animated decoy mechanisms use electric motors to provide the motive force to move or animate game bird decoys where activation of said decoy mechanisms use a direct coupled electro-mechanical means. Said means controls on and off activation of the mechanism for movement. U.S. Pat. No. 5,036,614, issued Aug. 6, 1991 to Jackson is a prior art example of a known decoy movement mechanism design which uses a controlled means that is directly coupled to said mechanism. Like prior known decoy movement mechanisms that incorporate direct coupled monofilament line, a major disadvantage of decoy movement mechanisms that incorporate direct coupled control means, is that they are often cumbersome to set up and make ready. In many instances, one skilled in the art is presented a situation where an approaching pursued game bird's proximity to said individual cannot allow a period that includes required setup time for the mechanism in hand without alerting the hunted game bird, therefore rendering the mechanism unusable. A further distinct disadvantage of said mechanisms is said mechanisms are limited to the control of one (1) decoy only. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

Still, other animated decoy mechanisms use electric motors to provide the force to move or animate game bird decoys where said movement follows a pre-programmed, or repeated oscillatory path. U.S. Pat. No. 6,212,816, issued Apr. 10, 2001 to Babbitt and U.S. Pat. No. 7,082,710, issued Aug. 1, 2006 to Jorgenson are prior art examples of known decoy movement mechanism designs which use pre-programmed decoy mechanism motions. A major disadvantage of such mechanisms is that atypical or unrealistic movement for extended periods of time may startle or warn the target animal of impending danger. When replicated motion is repeated and is unchanging in angle of rotation or time period, the ability to deceive approaching animals often ceases due to the pursued animal's ability to perceive an unnatural motion of said animated mechanisms. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

It has long been known, by those skilled in the art, that the activation of decoy motion when commanded by a mechanically decoupled radio transmitted signal, is a distinct advantage for pursuing game animals. U.S. Pat. No. 3,689,927, issued Sep. 5, 1972 to Boston, U.S. Pat. No. 5,233,780, issued Aug. 10, 1993 to Overholt and U.S. Pat. No. 5,289,654, issued Mar. 1, 1994 to Denny, are prior art examples of known non-mechanically coupled radio transmitted signal decoy movement mechanisms. A major disadvantage of prior art mechanisms is that they control only one (1) decoy mechanism with each single transmitted radio signal. In order to be more realistic and to enhance the opportunity for harvesting a male turkey, by one skilled in the art, multiple turkeys which are simultaneously motive is advantageous. The same, whom is skilled in the art, cannot provide motion to more than one decoy simultaneously from a single radio transmitted signal according to prior art. Individual multiple transmitted controlled signal device signals do not permit the operation of multiple independent decoy mechanisms. Multiple transmitted simultaneous signals interfere with each other resulting in unresponsive, intermittent or uncontrollable motion of the decoy mechanism of choice. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

It is further known by those skilled in the art that the motion imparted on any decoy should be as realistic as possible in order to enhance one's ability to harvest the pursued prey. U.S. Pat. No. 4,965,953 issued Oct. 30, to McKinney, makes the statement, "A wild turkey decoy, to be effective, must be realistic in its appearance and operation." During the spring mating season, male wild turkeys display a mating or territorial presentation called strutting. During this strutting display, said male wild turkeys will rotate as is they are fixed to one single vertical axis and the rotational speed of said strutting display is on or about four (4) revolutions per minute. It is further known by those skilled in the art that prior art motion mechanisms rotate wild turkey decoys. U.S. Patent Application Publication Number 2004/0025399, published Feb. 12, 2004 by Donnigan is one such mechanism. Donnigan's design includes a speed control device but fails to recognize two (2) critical disadvantages: 1) the turntable speed control device, allows one skilled in the art, the opportunity to adjust the rotational speed and 2) the identified rotational speed of a strutting male turkey is not defined. A major disadvantage, although an anticipated or perceived advantage, is that the settable turntable speed control device allows one skilled in the art to choose an infinite number of rotational speed settings, which are atypical or unrealistic of strutting male turkeys. A further disadvantage is that realistic rotational speed of the strutting male turkey, on or about four (4) revolutions per minute, was not defined for one skilled in the art. A decoy mechanism producing a rotational strutting speed, other than that expected by an approaching male wild turkey, reduces one's ability to deceive approaching animals. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

While prior art mechanisms used to impart decoy motion may be suitable for the particular purpose to which they were intended, they do not describe an invention capable of supporting and accurately rotating single or multiple simultaneous male turkey hunting decoys from a single radio-controlled transmitted signal. Therefore, it can be appreciated that there exists a continuing need for a new and improved male turkey decoy motion device, that can be used by those skilled in the art, to attract wild male turkeys. As such, a remotely-operated electronic rotatable decoy stand that can be easily and quickly set up, moves a male turkey decoy in a realistic rotational strutting manner, or simultaneously controls non-mechanically electronically coupled remotely-operated electronic rotatable decoy stands that can be easily and quickly set up, move simultaneously controlled male turkey decoys, up to five (5), in a realistic rotational strutting manner, when commanded to do so by a single radio transmitted signal, would be a unique and novel improvement.

SUMMARY OF THE INVENTION

In view of the foregoing disadvantages inherent in the known types of decoy motion mechanisms now present in the prior art, the present invention provides a newly improved remotely-operated electronic rotatable decoy stand. As such, the general purpose of the present invention, which will be described subsequently in greater detail, is to provide a new and improved decoy motion mechanism and method, which has many of the advantages of the prior art, none of the disadvantages of the prior art and new novel features that result in a new decoy motion mechanism which is not anticipated, rendered obvious, suggested, or implied by any prior art decoy motion devices.

To attain this, the present invention generally comprises an enclosure which comprises a power source that supplies power to a receiver that is responsive to a radio signal to control the switched current supplied to a direct current gearhead motor that is mechanically coupled, by proximity, to a gear set that is mechanically coupled, by proximity, to a spindle receiver which can be mechanically coupled to a single male turkey decoy, all receiving a control signal from a radio transmitter, resulting in bi-directional rotational decoy motion. The enclosure is generally positioned on the ground with the spindle receiver oriented skyward and perpendicular to the ground.

There has thus been outlined, rather broadly, the more important features of the invention in order that the detailed description thereof may be better understood, and in order that the present contribution to the art may be better appreciated. There are additional features of the invention described thereinafter that will form the subject matter of the claims appended hereto.

In this respect, before explaining at least one embodiment of the invention in detail, it is to be understood that the invention is not limited in its application of male turkey hunting decoys to the details of construction and to the components set forth in the following description or illustrated in the drawings. The invention is capable of other embodiments and of being practiced and carried out in various ways such as used with other game animals. Also, it is to be understood that the phraseology and terminology employed herein are for the purpose of the description and should not be regarded as limiting.

A primary object of the present invention is to provide a remotely-operated electronic rotatable decoy stand that has all of the advantages of prior art devices but will overcome the shortcomings of prior art devices.

A second object of the present invention is to provide a remotely-operated electronic rotatable decoy stand that can be easily and quickly set up.

Another object of the present invention is to provide a remotely-operated electronic rotatable decoy stand that moves a male turkey decoy in a realistic accurate rotational strutting manner on or about four (4) revolutions per minute.

An additional object of the present invention is to provide a remotely-operated electronic rotatable decoy stand whereby up to five (5) individual remotely-operated electronic rotatable decoy stands can be electronically non-mechanically linked and simultaneously controlled by a single remote radio transmitted signal.

A further object of the present invention is to provide a remotely-operated electronic rotatable decoy stand that is remotely controlled by a concealed hunting observer.

Other objects and advantages of the present invention will become obvious to the reader, and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
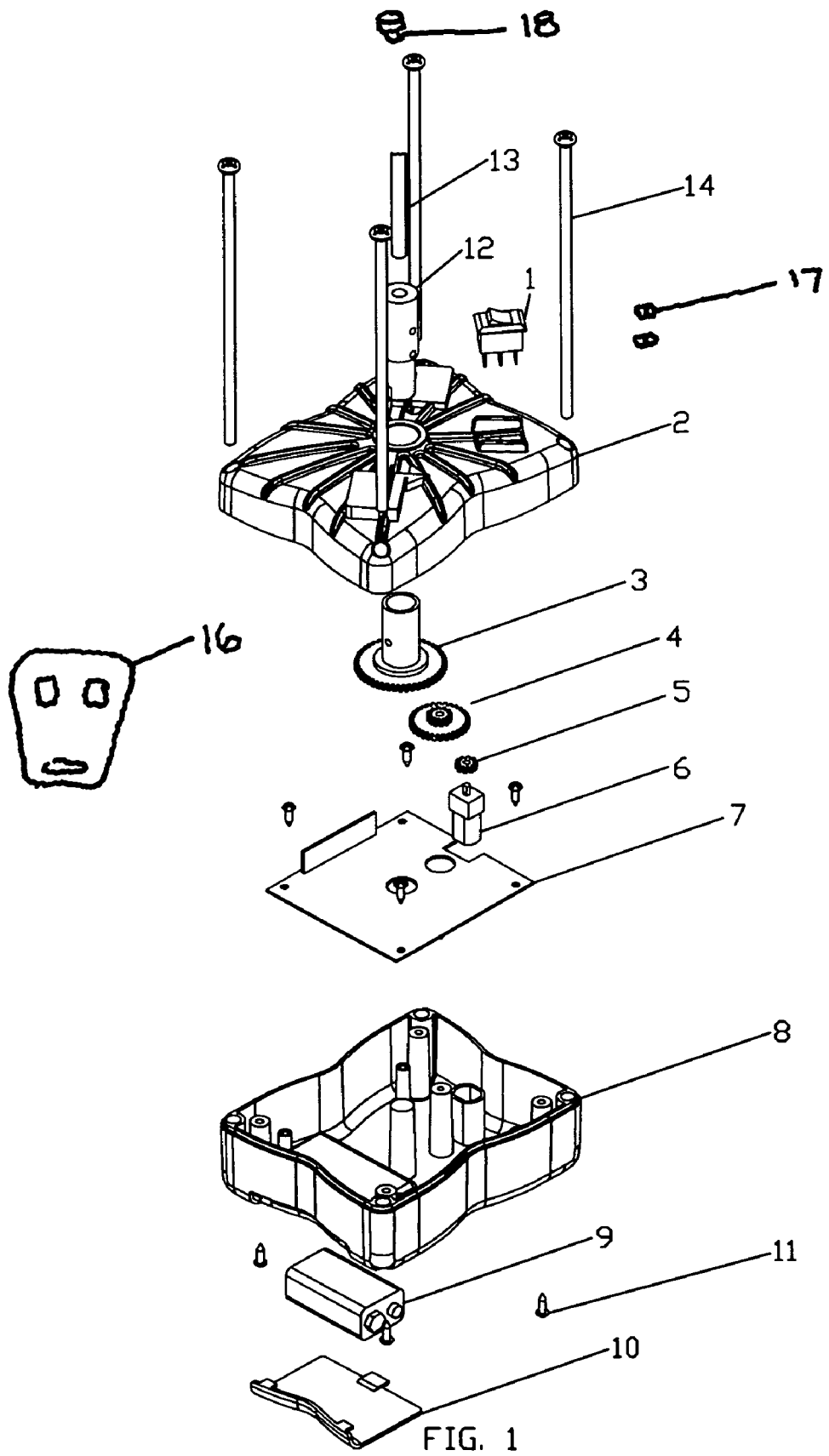
FIG. 1 shows an exploded view of the remotely-operated electronic rotatable decoy stand.
Figure 2A:
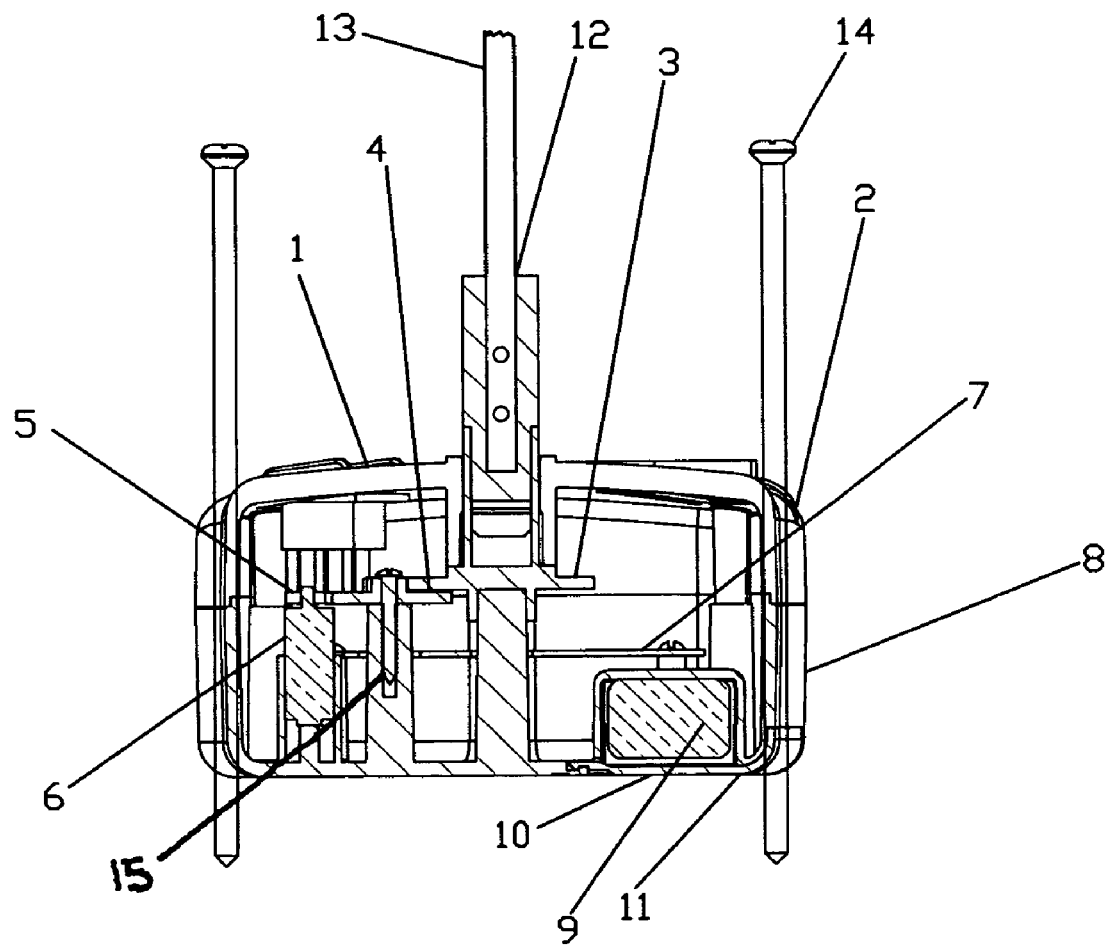
FIG. 2A shows a cutaway section view of the remotely-operated electronic rotatable decoy stand.
Figure 2B:
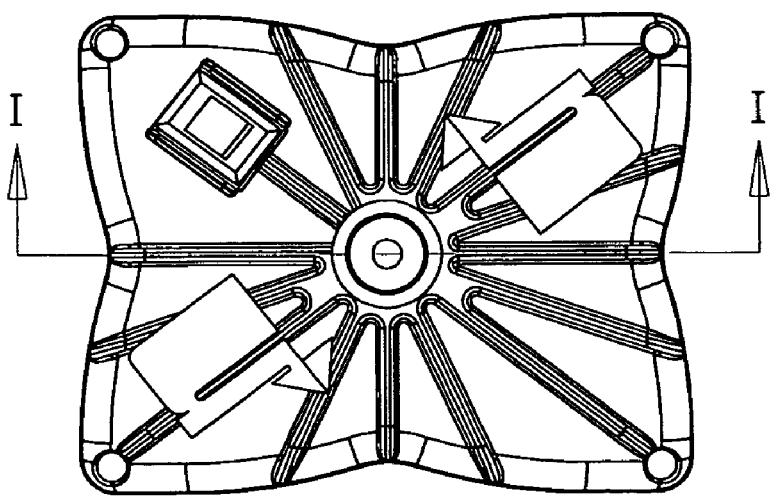
FIG. 2B shows a top view of the remotely-operated electronic rotatable decoy stand.
Figure 3A:
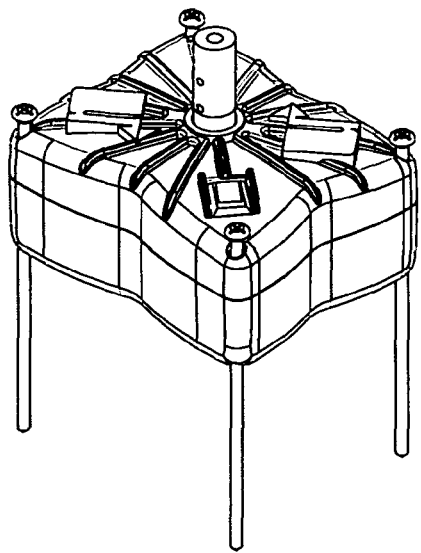
FIG. 3A shows an isometric view of the remotely-operated electronic rotatable decoy stand.
Figure 3B:
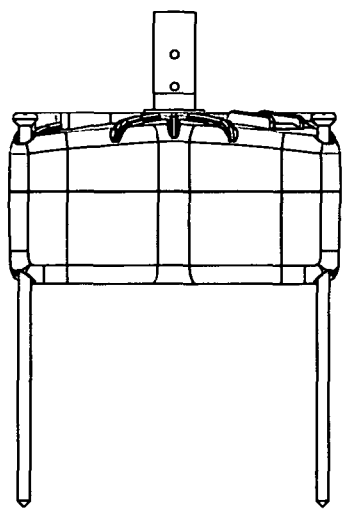
FIG. 3B shows a side view of the remotely-operated electronic rotatable decoy stand.
Figure 3C:
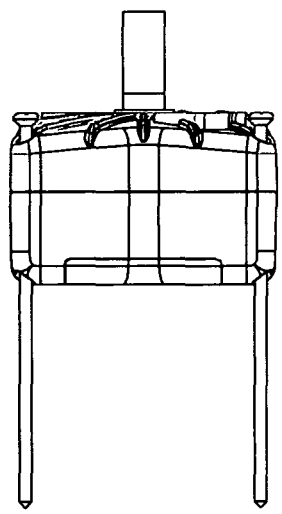
FIG. 3C shows an end view of the remotely-operated electronic rotatable decoy stand.

Referring now to the drawings in detail, of which several similar reference characters denote similar elements throughout the several views, FIGS. 1 through 3C illustrate the current invention, a remotely-operated electronic rotatable decoy stand, used to control the bi-directional rotational motion of a male turkey decoy. The remotely-operated electronic rotatable decoy stand comprising an enclosure made up of the lid 2 and base 8, a power source 9 supplying power, via an electrical conductor, to a receiver affixed to an electronic control board 7, supplying electrical control current, via an electrical conductor, to a direct current gear-head motor 6, by proximity, a step spur gear 4 is responsive to direct current gear-head motor 6 rotational mechanical energy, a spindle receiver 3 responsive to the gear set rotational mechanical energy, a transmitter that emits a radio signal simultaneously received, processed and converted to an electrical directional signal by five (5) or less independent non-mechanically coupled remotely-operated, electronic, rotatable decoy stand receivers.

In the preferred embodiment of the invention shown in FIG. 1, the remotely-operated, electronic, rotatable decoy stands power is supplied using a single 9-volt power source 9 which is located on the underside of the base 8. In order that the power source is installed, the power source compartment door 10 must be removed. The power source is fixedly attached to a set of leads that is fixedly attached via electrical conductor to the electronic control board 7. The power source is then inserted into a pocket, held in place, and enclosed using the power source compartment door 10.

Rotational motion and control of the remotely-operated electronic rotatable decoy stand is accomplished using a single remote transmitted signal which is emitted from a hand held fob 16 received by the electronic control board 7. The signal is used to drive a spur gear 5 which is fixedly attached to the shaft of the gear-head electric motor 6 which is oriented parallel to the spindle receiver 3. In order that the appropriate fixed rotational speed of four (4) revolutions per minute is achieved, the gear-head electric motor 6 output shaft speed is reduced using a spur gear mesh, Items 3, 4, and 5. At the same time the output speed of the small gear-head electric motor 6 is accomplished, the output torque increased and transferred to spindle receiver 3.

The electronic control board 7 is fixedly attached to the base shell 8 using four (4) screws 11. The gear-head electric motor 6 is fixedly attached to the electronic control board 7 by means of an electrical conductor and connector. The gear-head electric motor 6 is inserted into a containment pocket in base 8 which acts parallel to the plane of the spindle receiver 3 and is an integral part of the base 8. The containment pocket in base 8 produces an anti-rotation and opposite force such that the gear-head electric motor 6 produces the drive torque to rotate the driven step spur gear 4, which by proximity, produces the drive torque to rotate spindle receiver 3.

The driver spur gear 5 is fixedly attached to the gear-head electric motor 6 using a suitable adhesive element. Driver spur gear 5, by proximity, is coupled to the driven step spur gear 4, which is fixedly attached to a post using a socket head shoulder screw 15. By proximity, driven step spur gear 4 is coupled to the spindle receiver 3. By means of appropriate gear reduction between driver spur gear 5, driven step spur gear 4 and spindle receiver 3, an output rotational speed of spindle receiver 3 on or about four (4) revolutions per minute is obtained.

The electronic control board 7 was designed such that the output spindle 3 is located through the center of mass of the assembled rotatable decoy stand thus through said electronic control board 7.

Electric switch 1 is inserted into the remotely-operated electronic rotatable decoy stand lid 2 from the top. Once in place and secured, the electric switch 1 is fixedly attached, via an electrical conductor, to the electronic control board 7.

The remotely-operated electronic rotatable decoy stand lid 2 is placed over the outer bearing surface of spindle receiver 3 and slid down to its final resting position atop the base 8. The remotely-operated electronic rotatable decoy stand lid 2 and base 8 lip interface and are designed such that a watertight overlapping surface-to-surface contact is produced. In order that water or liquid not enter the internal cavity of the enclosure, the surface-to-surface contact path between the remotely-operated electronic rotatable decoy stand lid 2 and base 8 is of adequate interference, change in direction, and length such that liquids do not penetrate unless submerged in liquids for extended periods of time.

The remotely-operated electronic rotatable decoy stand lid 2 is fixedly attached to base 8 using four (4) screws 11. These screws are inserted through base 8 from the underside whereby they rest in a counter-bored hole with the securing end of the screws 11 protruding into the remotely-operated electronic rotatable decoy stand lid 2 whereby securing the remotely-operated electronic rotatable decoy stand lid 2 and base 8 assembly.

The blank end of Post 13 is inserted parallel and inline into the counter-bored hole, located on one end of the Coupling 12. Post 13 is inserted until bottom of the coupling 12 bore is reached, two (2) socket headset screws 17 are tightened such that the Coupling 12 and Post 13 are fixedly coupled together. The threaded end of the Post 13 is inserted through the body of the male turkey decoy. The Post 13 is secured to the decoy using a nylon thumb screw nut 18.

The remotely-operated electronic rotatable decoy stand is secured to the ground using the four (4) Stakes 14 by first setting the rotatable decoy stand on the ground then inserting the four (4) Stakes 14 through each of the four (4) corners of the remotely-operated electronic rotatable decoy stand penetrating the ground until the head of the Stakes 14 seats against the remotely-operated electronic rotatable decoy stand.

Male turkey decoy, Post 13 and Coupling 12 is then inserted into spindle receiver 3. The Coupling 12 and spindle receiver 3 use a male to female interference inner lock which transfers motion from the remotely-operated electronic rotatable decoy stand to the male turkey decoy.

Electric switch 1, by selecting the on position before returning to the desired position of the user, allows transfer of power current from power source 9 to electronic control board 7 to gear-head electric motor 6.

Multiple remotely-operated electronic rotatable decoy stand may be non-mechanically electronically coupled such that the hunting observer can send a single electronic transmitted signal, by means of a single hand held fob 16, to no more than five (5), remotely-operated electronic rotatable decoy stands simultaneously. With the single 9-volt power source 9 installed and electric switch 1 in the "on" position, electronic coupling is accomplished by removing rotatable decoy stand lid 2 from base 8 then depressing the ⅛" black momentary switch located on electronic control board 7 until the closely located red Light Emitting Diode is illuminated. Once illuminated, the hand held fob 16 is depressed repeatedly until the illuminated red Light Emitting Diode of electronic control board 7 is un-illuminated. This process is repeated on each remotely-operated electronic rotatable decoy stand, up to five (5), until all are remotely electronically coupled to one (1) electronic transmitted signal hand held fob 16.

The materials for which the remote decoy stand lid 2, base 8, and battery cover 10 is constructed is a high strength weather resistant plastic but may be varied within and through use of similar compounds and/or compositions. Material color should be one that remains inconspicuous to the pursued animal. It is therefore preferred that color be one that is neutral or that it be a camouflage duplication of the surrounding topography occupied by pursued animals.

Post 13 is preferably constructed of steel and is coated such that it is relatively inconspicuous when removably coupled to a decoy. It is therefore preferred that its surfaces be of a neutral color suitable for blending with the landscape where it is to be used, or that it be camouflaged. For the same reason, it is desirable that Post 13 not be overly large or bulky, but maintain longitudinal stiffness. In particular, post 13 is preferably slender, so that its attachment to a decoy does not detract from the visual illusion created by the decoy.

Spindle receiver 3, driven step spur gear 4 and driver spur gear 5 are constructed of a plastic material that provides for non-friction contact between the mesh of successive gear teeth, but may be varied within and through use of similar compounds and/or composition plastic materials which yield the same or similar non-friction results.

When a male wild turkey appears and is in visual range of the male turkey decoy being supported by the remotely-operated electronic rotatable decoy stand, the concealed user rotates the male turkey decoy by supplying a transmitted radio signal which is received by the remotely-operated electronic rotatable decoy stand, processed and converted to an electrical directional signal which is transferred to a mechanical rotational output so that the male turkey decoy is rotated to directly face the male wild turkey.

A territorial male turkey will typically perceive this movement as a behavior intended to challenge him, his mating rights and his territory and will approach and even attack the decoy. When a non-territorial male wild turkey, within visual range of the single male turkey decoy, is a subordinate male turkey, rotating the male turkey decoy to face away from said subordinate male turkey, subordination is conveyed and interpreted by pursued subordinate wild turkey which yields confidence and said subordinate male wild turkey will approach. In both instances, a hunter is given ample opportunity to fire on and harvest either male wild turkey.

Similar strategies may be used to attract other animals. By considering how the animal represented by a decoy would naturally react to the approach of the animal being attracted, and by mimicking that expected behavior by appropriately rotating a decoy, a user may greatly increase the effectiveness of a decoy and increase his opportunities for successfully pursuing game animals. An important form of animal communication occurs when an animal directly faces toward, or turns away from, a distant individual. The appropriate rotation of a male turkey decoy using the present invention can convincingly mimic natural behaviors and presentation, greatly increase the male turkey decoy's effectiveness relative to non-rotatable male turkey decoys, male turkey decoys animated with monofilament, partial motion mechanized male turkey decoys, or remotely transmitted male turkey decoy motion systems that only animate one male turkey decoy.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What I claim as my invention is:

1. A remotely operated electronic rotatable decoy stand, wherein said stand comprises a lid and a base;
   a plurality of stakes connected to said stand whereby a secure mounting to the ground may be established; a spindle extending upwardly from said lid to receive a decoy; said spindle having an associated spindle receiver;
   wherein said lid and base together form a means to house an electronic control system comprising: an internal electronic control board, a direct current motor and associated drive spur gear, a driven reduced spur gear, and a driven spur gear affixed to the spindle receiver;
   an electronic remote fob when activated emits a signal received by the electronic control board thereby allowing the electronic system to work to rotate an associated decoy at approximately four revolutions per minute;
   said remote fob being capable of signaling, thereby activating, up to five of said electronic rotatable decoy stands simultaneously.

2. The rotatable decoy stand of claim 1, wherein the electronic control system is programmable.

* * * * *